US009550409B2

(12) United States Patent
Ten-Jet-Foei

(10) Patent No.: US 9,550,409 B2
(45) Date of Patent: Jan. 24, 2017

(54) OPEN ROOF CONSTRUCTION FOR A VEHICLE AND ROLLO ASSEMBLY THEREFOR

(71) Applicant: Inalfa Roof Systems Group B.V., Venray (NL)

(72) Inventor: Suyanto Teri Wahiyu Ten-Jet-Foei, Nijmegen (NL)

(73) Assignee: INALFA ROOF SYSTEMS GROUP B.V., Venray (NL)

( * ) Notice: Subject to any disclaimer, the term of this patent is extended or adjusted under 35 U.S.C. 154(b) by 0 days.

(21) Appl. No.: 15/019,338

(22) Filed: Feb. 9, 2016

(65) Prior Publication Data

US 2016/0236548 A1 Aug. 18, 2016

(30) Foreign Application Priority Data

Feb. 12, 2015 (EP) .................................... 15154788

(51) Int. Cl.
*B60J 3/02* (2006.01)
*B60J 7/00* (2006.01)
(Continued)

(52) U.S. Cl.
CPC .............. *B60J 7/0023* (2013.01); *B60J 7/0015* (2013.01); *B60Q 3/002* (2013.01); *B60Q 3/004* (2013.01);
(Continued)

(58) Field of Classification Search
CPC ........ B60J 7/0015; G02B 6/006; G02B 6/008; G02B 6/0073; G02B 6/0075; G02B 6/0078; B60Q 3/0203; B60Q 3/0213; B60Q 3/0243; B60Q 3/002
(Continued)

(56) References Cited

U.S. PATENT DOCUMENTS

| 7,204,548 | B2 * | 4/2007 | Wilms | ................ B60R 13/0231 296/214 |
| 8,281,847 | B2 * | 10/2012 | Uehara | .................. B60J 7/0015 160/265 |
| 2004/0056504 | A1 * | 3/2004 | Hattass | .................. B60J 1/2069 296/97.1 |

FOREIGN PATENT DOCUMENTS

DE 60 2005 006 027 T2 5/2009
DE 199 36 537 A1 2/2011
(Continued)

OTHER PUBLICATIONS

Extended European Search Report for European Patent Application No. 15154788.2-1756, dated Jul. 24, 2015, 7 pages.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises an opening in a stationary roof part and a rollo assembly positioned below said roof opening intended for covering the roof opening. The rollo assembly comprises a rollo screen and a winding shaft for the rollo screen which is rotatable around a stationary axis of rotation, and the rollo screen, starting from the winding shaft, firstly extends in a first direction, next around a reversal member and finally back in an opposite second direction and ends at a rollo screen edge. The reversal member is movable in parallel to said first and second directions in correspondence with the amount of rollo screen being wound on or off said winding shaft. The rollo screen is provided with light emitting members which are activated through connections provided at the interface between said rollo screen edge and a stationary part of the open roof construction.

16 Claims, 4 Drawing Sheets

(51) Int. Cl.
*B60Q 3/02* (2006.01)
*B60Q 3/00* (2006.01)
*F21V 8/00* (2006.01)

(52) U.S. Cl.
CPC .......... *B60Q 3/0213* (2013.01); *B60Q 3/0243* (2013.01); *G02B 6/001* (2013.01); *G02B 6/0006* (2013.01)

(58) Field of Classification Search
USPC ........................... 296/214, 216.01–224, 219
See application file for complete search history.

(56) References Cited

FOREIGN PATENT DOCUMENTS

| DE | 10 2012 012 814 A1 | 12/2012 |
| DE | 10 2011 108 031 A1 | 1/2013 |
| FR | 2 941 735 A1 | 8/2010 |
| KR | 10-2010-0020318 A | 2/2010 |
| WO | 2013/171038 A1 | 11/2013 |

\* cited by examiner

OPEN ROOF CONSTRUCTION FOR A VEHICLE AND ROLLO ASSEMBLY THEREFOR

BACKGROUND

The discussion below is merely provided for general background information and is not intended to be used as an aid in determining the scope of the claimed subject matter.

Aspects of the invention firstly relate to an open roof construction for a vehicle, comprising a roof opening in a stationary roof part and a rollo assembly positioned below said roof opening and intended for covering the roof opening, wherein the rollo assembly comprises a rollo screen and a winding shaft for the rollo screen which is rotatable around a stationary axis of rotation, and wherein the rollo screen, starting from the winding shaft, firstly extends in a first direction, next around a reversal member and finally back in an opposite second direction and ends at a rollo screen edge which is attached to a stationary member of the open roof construction, wherein the reversal member is movable in parallel to said first and second directions in correspondence with the amount of rollo screen being wound on or off said winding shaft.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An open roof construction includes a rollo screen that is provided with light emitting members which are activated through connections provided at the interface between said rollo screen edge and a stationary part of the open roof construction.

The construction in a favorable manner takes advantage of the stationary position of the rollo screen edge (which results from its attachment to the stationary member of the open roof construction) for activating the light emitting members. Because of such a stationary position of the rollo screen edge the said connections also have a stationary position between the rollo screen edge and the said stationary part of the open roof construction. This has a positive effect on the life span and reliability of these connections, while allowing to simplify the design of these connections. The light emitting members may be used for lighting purposes but also may provide an attractive appearance. It is conceivable that a driver at will can switch the light emitting members on or off, but it also is possible that switching on or off occurs automatically (for example triggered by sunset or by opening a vehicle door—thus providing an aid while entering or leaving the vehicle).

It is noted that the type of connection with the light emitting members will depend on the type of light emitting member and the type of activation required, and for example may be electrical or optical.

In one embodiment the light emitting members comprise light transmitting fibers provided in or on the rollo screen, which at said interface are connected to at least one light source provided at said stationary part of the open roof construction. In this embodiment the fibers only need to transmit (and emit) the light introduced at the respective connections by the light source(s). This allows to simplify the design of the rollo screen. The fibers, for example, may comprise plastic or fiber glass fibers which may be very thin (for example having a diameter as small as 0.25 mm). The light source(s) will be provided on said stationary part where, generally, more room is available.

The light source may come in many different types, for example as a LED light source.

In another embodiment each light source is connected to a number of light transmitting fibers which have ends bundled and intended for connection to the respective light source. This means that the number of light sources may be kept at a minimum notwithstanding the possibility to use a large amount of fibers.

It is possible, for example, that a number of light sources, preferably from 2-20 light sources, are arranged side by side. In an exemplary embodiment the fibers are grouped into seven bundles of fibers each assigned to an own light source.

In a specific embodiment of the open roof construction the at least one light source is housed in a transverse member which is located at and extends in parallel to a forward or rearward edge of the roof opening and which defines said stationary part of the open roof construction. Such a transverse member thus extends perpendicularly to said first and second directions. The transverse member provides a support and protection for each light source.

In a further embodiment, then, it is possible that the transverse member is a hollow profiled member in which an interior part is provided for housing the at least one light source and having, for each light source, a through opening for connecting the light source to the respective light transmitting fibers. The light transmitting fibers (preferably grouped into bundles) are connected to the respective light source through a respective through opening in such an interior part.

It is possible that the transverse member and the winding shaft are substantially positioned at the same level, such that the winding shaft is located behind the transverse member as seen in a direction from the roof opening towards the transverse member. This yields a rollo assembly, and thus an open roof construction, with a minimized overall height.

In one embodiment the transverse member is provided with a guide intended for guiding the rollo screen.

In one embodiment the transverse member further defines the stationary member of the open roof construction to which the rollo screen edge is attached. As a result the transverse member has a second function apart from housing the at least one light source.

The reversal member of the open roof construction may have two opposite ends guided in two opposite guides extending in parallel to said first and second directions at opposite side edges of the roof opening, wherein further a drive mechanism is provided engaging said opposite ends of the reversal member. Such a drive mechanism for example may comprise motor driven cables running in cable channels formed in the guides (as is common in the field of open roof constructions). The drive mechanism may move the reversal member (and thus the rollo screen) in a sense for unwinding/winding it from/on the winding shaft. The winding may be assisted by internal spring means provided in the winding shaft (such as a coiled spring).

The reversal member may comprise a rotatable cylindrical member which rotates in correspondence with the movement of the rollo screen relative to the reversal member. As an alternative the reversal member may comprise a non-rotating member with (or offering) a low friction surface intended for engaging the rollo screen. In the latter case the rollo screen will slide over the reversal member.

The reversal member at its side facing away from the winding shaft at least partly may be surrounded by a cover member. Such a cover member (which generally will extend over the entire transverse length of the reversal member) conceals the part of the rollo screen with light emitting members which is directly engaged by and extends around the reversal member. This may have aesthetical benefits.

In yet another embodiment of the open roof construction a part of the rollo screen extending between the winding shaft and the reversal member is located above a (lower) part of the rollo screen extending between the reversal member and the stationary member of the open roof construction, and wherein, as seen in a situation in which the reversal member assumes its position farthest away from the winding shaft, the part of the rollo screen extending between the winding shaft and the reversal member for a major part is made of a number of transversally spaced longitudinal members, such as strips, cords or belts. The use of such longitudinal members reduces the amount of material to be wound on the winding shaft and thus reduces the diameter of the winding shaft with material wound thereon.

Depending on the specific application the longitudinal members may be flexible and elastic or non-elastic.

In a specific embodiment only two longitudinal members are provided defining opposite side edges of the respective part of the rollo screen and wherein said longitudinal members at the connection with the remainder of the rollo screen are connected by a stiffening part. The use of only two longitudinal members at those side edges prevents the formation of shadows on the part of the rollo screen extending there below. The stiffening part assures that forces introduced into the lower rollo screen part by said longitudinal members at those side edges also are transferred to central parts of said lower rollo screen part, such that this lower rollo screen part is kept in a taut state all over its width.

An aspect of the invention further relates to a rollo assembly intended for use in an open roof construction.

BRIEF DESCRIPTION OF THE DRAWINGS

Hereinafter aspects of the invention will be elucidated while referring to the drawings, in which.

DETAILED DESCRIPTION OF ILLUSTRATIVE EMBODIMENTS

Figure 1:
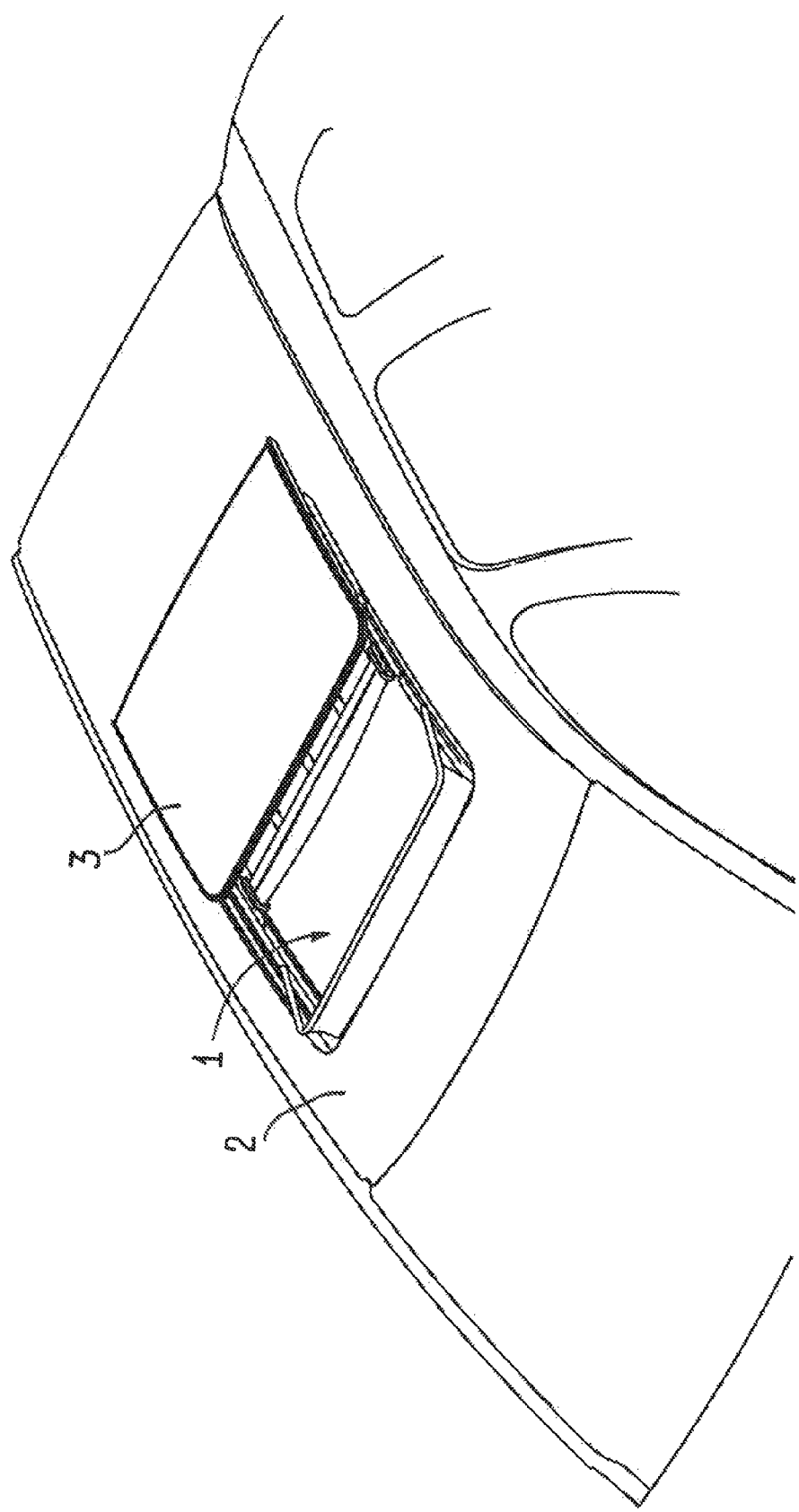
FIG. 1 shows a general perspective view of an open roof construction.

Referring firstly to FIG. 1, an open roof construction for a vehicle is illustrated. It comprises a roof opening 1 in a stationary roof part 2 which can be closed by a movable roof panel 3. As is known in the respective field, such a roof panel 3 may be operated (by means not illustrated but generally known) for opening and closing the roof opening 1.

Figure 3:
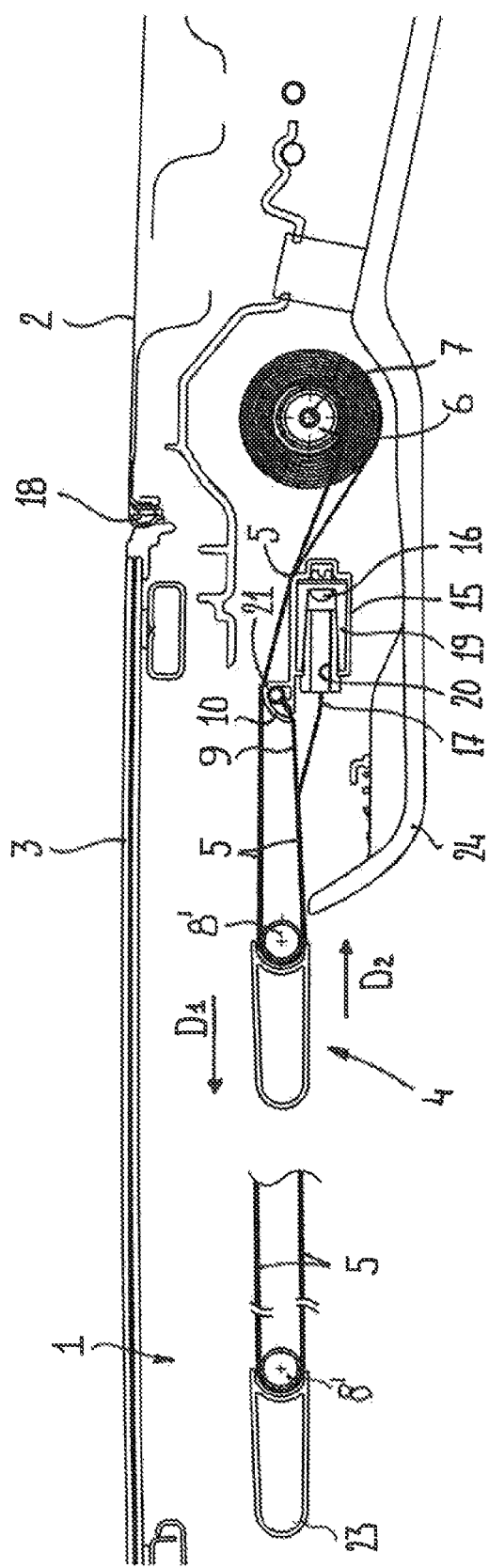
FIG. 3, likewise schematically, illustrates a cross section according to III-III in FIG. 2, and FIG. 4 schematically illustrates a perspective view of an alternative embodiment.

Specifically referring to FIG. 3 a rollo assembly 4 is positioned below said roof opening 1 (although it is noted that parts of such a rollo assembly 4 also may be located below the stationary roof part 2). The rollo assembly 4 comprises a rollo screen 5 and a winding shaft 6 for the rollo screen 5 which is rotatable around a stationary axis of rotation 7. The rollo screen 5, starting from the winding shaft 6, firstly extends substantially in a first direction D1, next around a reversal member 8 and finally back in an opposite second direction D2 and ends at a rollo screen edge 9 which is attached to a stationary member 10 of the open roof construction.

Figure 2:
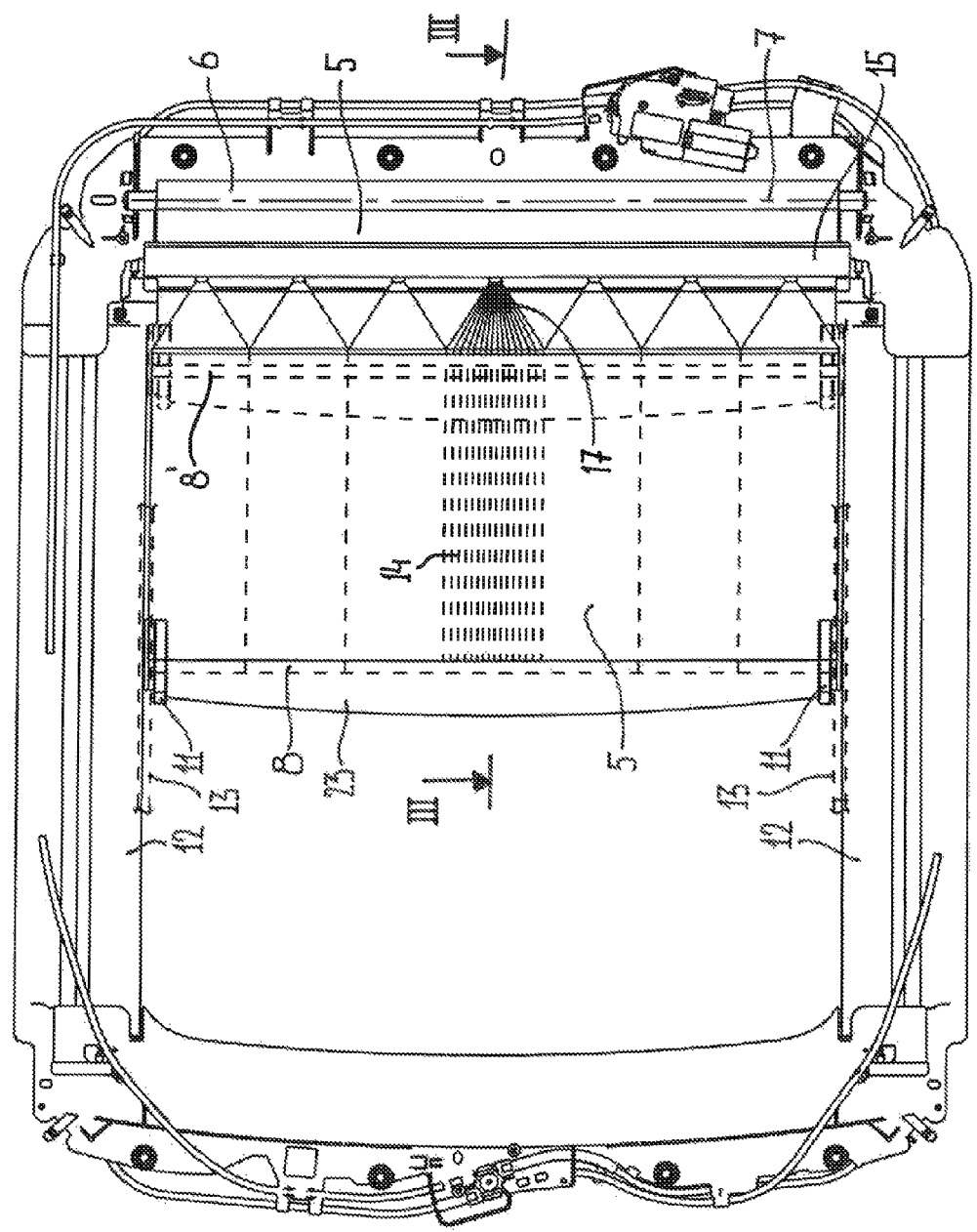
FIG. 2 schematically illustrates a bottom view of an open roof construction.

The reversal member 8 is movable in parallel to said first and second directions D1,D2 in correspondence with the amount of rollo screen 5 being wound on or off said winding shaft 6. For achieving the required translational movement of the reversal member 8 it has two opposite ends 11 (FIG. 2) guided in two opposite guides 12 extending in parallel to said first and second directions D1,D2 (generally the lengthwise direction of the vehicle) at opposite side edges of the roof opening 1. Two drive cables 13 (which are part of a drive mechanism) are provided engaging said opposite ends 11 of the reversal member 8. The drive cables 13 may run in cable channels (not illustrated) provided in the guides 12. The position of the reversal member 8 and thus of the rollo screen 5 is controlled by the drive cables 13. In FIG. 3 the reversal member 8 (and thus the rollo screen 5) has been illustrated in two different positions: right a position 8' in which the rollo screen 5 is in a position substantially fully opening the roof opening 1 and at least partially hidden by a headlining 24 and left a fully closed position 8. In FIG. 2 position 8' substantially corresponds with position 8' in FIG. 3, but position 8 in FIG. 2 shows a position of the reversal member in which the roof opening 1 is half closed.

It is possible that the winding shaft 6 is provided with a spring member (such as an internal coiled spring) biasing the winding shaft in a direction for winding the rollo screen 5. As a result the rollo screen always is kept taut, irrespective the position of the reversal member 8.

The guides 12 also may be used for supporting the rollo screen 5 and keeping it in a desired position. For example, when the reversal member 8 moves away from the winding shaft 6 the rollo screen 5 may be deposited on top of a part of those guides 12 which is positioned at a level below the reversal member 8.

In the illustrated embodiment the reversal member 8 comprises a rotatable cylindrical member which will rotate in accordance with the rollo screen 5 moving around it when the reversal member 8 is displaced. As an alternative (not illustrated) the reversal member may comprise a non-rotating member providing or defining a low friction surface intended for engaging the rollo screen 5.

The reversal member 8 further is provided with a cover member 23 which hides the part of the rollo screen 5 extending around the reversal member 8 from view.

The rollo screen 5 is provided with light emitting members, here light transmitting (and emitting) fibers 14 (only illustrated in FIG. 2) provided in or on the rollo screen 5, which are activated through connections provided at the interface between said rollo screen edge 9 and a stationary part 15 of the open roof construction. Specifically, as shown in FIG. 3, the light transmitting fibers 14, at said interface, are connected to at least one light source 16 (for example a LED light source provided with a lens) provided on (or in) said stationary part 15 of the open roof construction.

Each light source 16 is connected to a number of light transmitting fibers 14 which have ends bundled (into bundles 17) and intended for connection to the respective light source 16.

The manner in which light emitting members for their activation are connected to respective activating members may vary. There may be physical connections (for example when electrical current has to be transferred to light emitting members which operate electrically), but it also is conceivable that there is no physical connection, but only a functional connection (for example when the light emitting members comprise light transmitting fibers 14 in which light has to be introduced, as through lenses as indicated above).

Further it is noted that in the illustrated embodiment the rollo screen edge 9 is directly connected to the stationary member 10, whereas the bundles 17 define an additional activating connection with a stationary part 15 of the open roof construction. In such an embodiment the bundles 17 are not loaded by any tension in the rollo screen 5. In an alternative embodiment it is conceivable however, that the bundles 17 act as sole connection between the rollo screen 5 and a stationary member or part of the open roof construction and, as a result, are loaded by any tension in the rollo screen 5.

Depending on the design of the rollo screen 5 and the amount and/or pattern of the light transmitting fibers 14 a number of light sources 16 may be arranged side by side. In the illustrated embodiment seven light sources (e.g. LEDs) 16 are provided. Also the provision of only one light source 16 (for example a single wide LED) is conceivable.

The light sources 16 are housed in a transverse member (in the illustrated embodiment defining the stationary part 15) which is located at and extends in parallel to a forward or rearward edge 18 (see FIG. 3) of the roof opening 1. Specifically, said transverse member 15 is a hollow profiled member in which an interior part 19 (or a number of such parts) is provided for housing the light source(s) 16 and having, for each light source, a through opening 20 for guiding a respective bundle 17 of light transmitting fibers 14 towards a respective light source 16.

In the illustrated embodiment the transverse member 15 and the winding shaft 6 are substantially positioned at the same level (as seen in a normal position of use of the vehicle), such that the winding shaft 6 is located behind the transverse member 15 as seen in a direction (according to D2) from the roof opening 1 towards the transverse member 15. Further a guide 21 is provided extending in parallel to the transverse member 15 and intended for guiding the rollo screen 5 from the winding shaft 6 substantially in said first direction D1 over the transverse member 15. In the illustrated embodiment the guide 21, stationary member 10 and stationary part/transverse member 15 are integrated into a single part.

Figure 4:
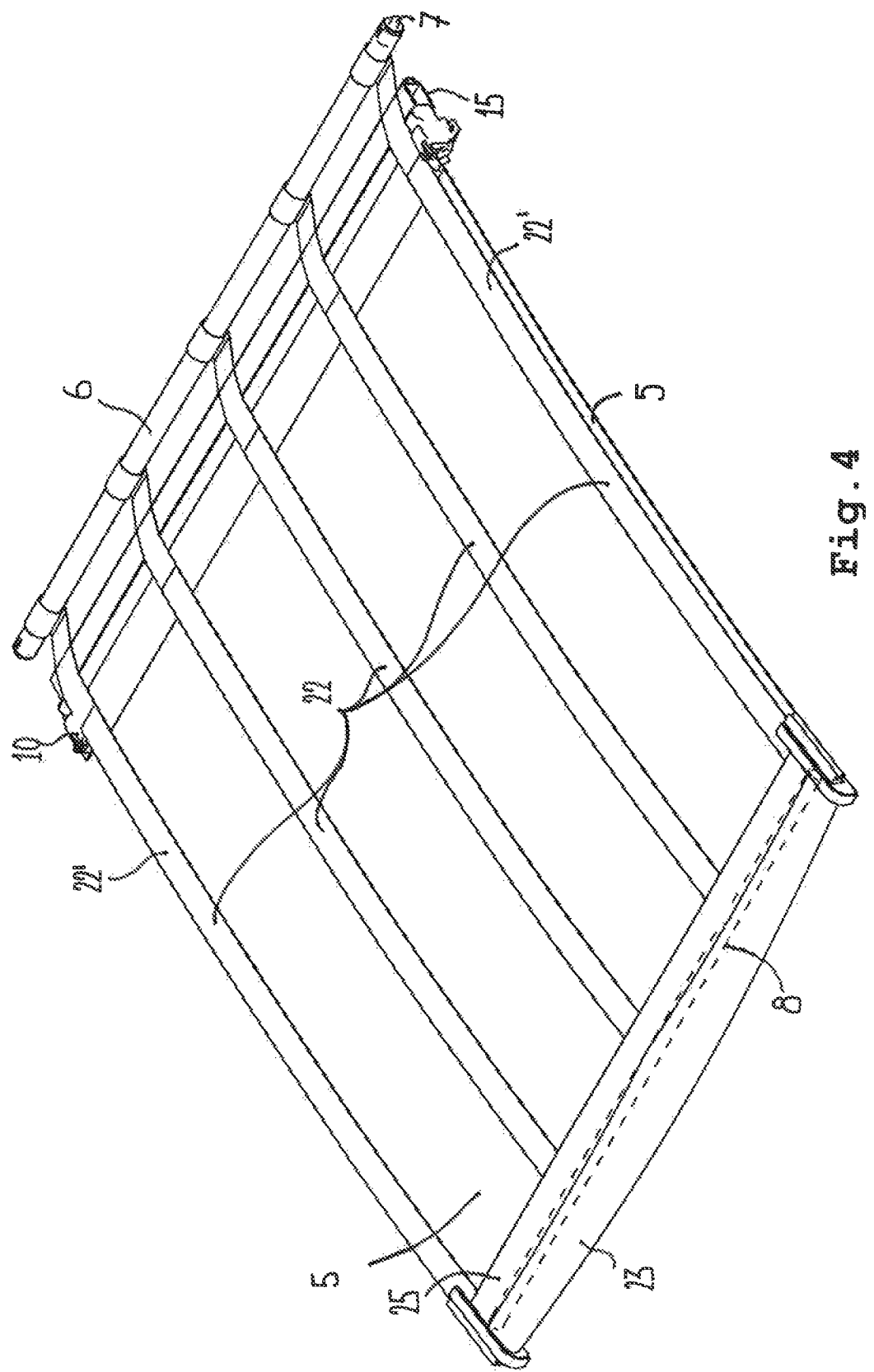

Finally reference is made to FIG. 4 which schematically and perspectively shows part of an alternative embodiment of the open roof construction. In this embodiment, in a situation in which the reversal member 8 assumes its position farthest away from the winding shaft 6, the part of the rollo screen 5 extending between the winding shaft 6 and the reversal member 8 (which is located above the part of the rollo screen 5 extending between the reversal member 8 and the stationary member 10) for a major part is made of a number of transversally spaced, preferably flexible at one hand and elastic or non-elastic at the other, longitudinal members 22, such as strips, cords or belts. Thus, at said part the rollo screen 5 does not extend continuously in a transverse direction but provides free spaces between said longitudinal members 22.

In a specific embodiment only two longitudinal members (schematically indicated as 22') are provided defining opposite side edges of the respective part of the rollo screen. Thus the formation of shadows on the part of the rollo screen 5 there below may be minimized. In the illustrated embodiment, further, said longitudinal members 22' at the connection with the remainder of the rollo screen 5 are connected by a stiffening part 25.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. An open roof construction for a vehicle, comprising:
a roof opening in a stationary roof part, and
a rollo assembly positioned below said roof opening intended for covering the roof opening independently of a moveable roof panel, wherein the rollo assembly comprises a rollo screen and a winding shaft for the rollo screen which is rotatable around a stationary axis of rotation, and wherein the rollo screen, starting from the winding shaft, firstly extends in a first direction, next around a reversal member and finally back in an opposite second direction and ends at a rollo screen edge which is attached to a stationary member of the open roof construction, wherein the reversal member is movable in parallel to said first and second directions in correspondence with the amount of rollo screen being wound on or off said winding shaft, and wherein the rollo screen is provided with light emitting members which are activated through connections provided at an interface between said rollo screen edge and a stationary part of the open roof construction.

2. The open roof construction according to claim 1, wherein the light emitting members comprise light transmitting fibers provided with the rollo screen, which at said interface are connected to at least one light source provided at said stationary part of the open roof construction.

3. The open roof construction according to claim 2, wherein the at least one light source comprises a LED light source.

4. The open roof construction according to claim 2, wherein each light source is connected to a number of light transmitting fibers which have ends bundled and intended for connection to the respective light source.

5. The open roof construction according to claim 4, wherein a number of light sources are arranged side by side.

6. The open roof construction according to claim 2, wherein the at least one light source is housed in a transverse member which is located at and extends in parallel to a forward or rearward edge (18) of the roof opening and which defines said stationary part of the open roof construction.

7. The open roof construction according to claim 6, wherein the transverse member is a hollow profiled member in which an interior part is provided for housing the at least one light source and having, for each light source, a through opening for connecting the light source to the respective light transmitting fibers.

8. The open roof construction according to claim 6, wherein the transverse member is provided with a guide intended for guiding the rollo screen.

9. The open roof construction according to claim 6, wherein the transverse member further defines the stationary member of the open roof construction to which the rollo screen edge is attached.

10. The open roof construction according to claim 1, wherein the reversal member has two opposite ends guided in two opposite guides extending in parallel to said first and second directions at opposite side edges of the roof opening, wherein further a drive mechanism is provided engaging said opposite ends of the reversal member.

11. The open roof construction according to claim 1, wherein the reversal member comprises a rotatable cylindrical member.

12. The open roof construction according to claim 1, wherein the reversal member comprises a non-rotating member with a low friction surface intended for engaging the rollo screen.

13. The open roof construction according to claim 1, wherein the reversal member at its side facing away from the winding shaft at least partly is surrounded by a cover member.

14. The open roof construction according to claim 1, wherein a part of the rollo screen extending between the winding shaft and the reversal member is located above a part of the rollo screen extending between the reversal member and the stationary member of the open roof construction, and wherein, as seen in a situation in which the reversal member assumes its position farthest away from the winding shaft, the part of the rollo screen extending between the winding shaft and the reversal member for a major part is made of a number of transversally spaced longitudinal members.

15. The open roof construction according to claim 14, wherein said longitudinal members are flexible and elastic or non-elastic.

16. The open roof construction according to claim 14, wherein only two longitudinal members are provided defining opposite side edges of the respective part of the rollo screen and wherein said longitudinal members at the connection with the remainder of the rollo screen are connected by a stiffening part.

* * * * *